(12) United States Patent
Mitlitsky

(10) Patent No.: US 7,360,563 B2
(45) Date of Patent: Apr. 22, 2008

(54) SYSTEM AND METHOD FOR REFUELING A HYDROGEN VESSEL

(75) Inventor: Fred Mitlitsky, Livermore, CA (US)

(73) Assignee: Proton Energy Systems, Inc., Wallingford, CT (US)

( * ) Notice: Subject to any disclaimer, the term of this patent is extended or adjusted under 35 U.S.C. 154(b) by 793 days.

(21) Appl. No.: 10/248,472

(22) Filed: Jan. 22, 2003

(65) Prior Publication Data

US 2003/0146106 A1    Aug. 7, 2003

Related U.S. Application Data

(60) Provisional application No. 60/319,087, filed on Jan. 22, 2002.

(51) Int. Cl.
*B65B 1/04* (2006.01)

(52) U.S. Cl. ............................... 141/2; 141/18; 141/82

(58) Field of Classification Search .................. 141/82, 141/94, 95, 47, 49, 51; 52/50.2–50.5
See application file for complete search history.

(56) References Cited

U.S. PATENT DOCUMENTS

| | | | |
|---|---|---|---|
| 4,002,553 A | 1/1977 | Arntz | |
| 4,528,614 A | 7/1985 | Shariff et al. | |
| 4,625,627 A | 12/1986 | Livanos et al. | |
| 4,963,235 A | 10/1990 | Brattan et al. | 204/98 |
| 5,138,522 A | 8/1992 | Kojima et al. | |
| 5,238,030 A | 8/1993 | Miller et al. | |
| 5,365,981 A * | 11/1994 | Peschka et al. | |
| 5,409,046 A | 4/1995 | Swenson et al. | |
| 5,542,459 A * | 8/1996 | Price et al. | 141/18 |
| 5,771,946 A * | 6/1998 | Kooy et al. | 141/82 |
| 5,779,866 A | 7/1998 | Tarancon | 204/262 |
| 5,800,258 A | 9/1998 | Knoop et al. | |
| 5,884,675 A | 3/1999 | Krasnov | |
| 5,913,344 A | 6/1999 | Wronski et al. | |
| 5,980,726 A | 11/1999 | Moulthrop, Jr. et al. | 205/637 |
| 5,983,962 A | 11/1999 | Gerardot | |
| 6,182,717 B1 * | 2/2001 | Yamashita | 141/82 |
| 6,289,692 B1 * | 9/2001 | Houser et al. | 62/613 |
| 6,432,283 B1 | 8/2002 | Fairlie et al. | |

(Continued)

FOREIGN PATENT DOCUMENTS

FR    2773822    7/1999

(Continued)

OTHER PUBLICATIONS

Japanese Patent Application No.: JP 2001130901; Publication DAte: May 15, 2001; Abstract Only (1 page).

(Continued)

*Primary Examiner*—Steven O. Douglas
(74) *Attorney, Agent, or Firm*—Cantor Colburn LLP

(57) ABSTRACT

Electrochemical systems and methods of operating the systems are disclosed herein. In one embodiment, a method for operating an electrochemical system, comprises: forming hydrogen gas in an electrolysis cell, maintaining the hydrogen gas at a temperature sufficient to enable the filling of a hydrogen gas vessel at a rate that would fill a 5 kg vessel with the hydrogen gas in a period of time of less than or equal to about 10 minutes, and introducing the hydrogen gas to the hydrogen gas vessel.

22 Claims, 3 Drawing Sheets

U.S. PATENT DOCUMENTS

| | | | |
|---|---|---|---|
| 6,468,412 B2 | 10/2002 | Bryan et al. | 205/500 |
| 6,745,801 B1 | 6/2004 | Cohen et al. | |
| 6,755,225 B1 | 6/2004 | Niedwiecki et al. | |
| 6,786,245 B1 | 9/2004 | Eichelberger et al. | |
| 6,810,925 B2 | 11/2004 | Graham et al. | |

FOREIGN PATENT DOCUMENTS

| | | |
|---|---|---|
| WO | WO 00/70262 | 11/2000 |

OTHER PUBLICATIONS

Japanese Patent Application No. JP 19930153144; Publication Date: Jan. 17, 1995; Abstract Only (1 page).

European Search Report; European Patent Application No.: 03001164.7-2119-; Dated Aug. 14, 2003; 3 pages.

European Search Report; European Patent Application No.: 03001163.9-2119-; Dated Jun. 11, 2003, 4 pages.

Kountz "Modeling the fast fill process in natural gas vehicle storage cylinders" Institute of Gas Technology pp. 462-469, no date.

Daney et al. "Hydrogen vehicle fueling station" Advances in Cryogenic Engineering, vol. 41 pp. 1041-1048, no date.

Mitlitsky "Regenerative Fuel Cell Systems R&D" Proceedings of the 1998 DOE Hydrogen Program Review, 1998.

"Stuart energy systems—the hydrogen fuel company" www.power-technology.com/contractors/fuel/stuart/index.htm Jan. 11, 2002.

"Five years in the making, $18 million hydrogen prcuction/fueling station opens in Munich" www.hftletter.com/letter/june99/feature.html Jan. 11, 2002.

"Bus Fueler ideal for buses and trucks" www.stuartenergy.com, no date.

"Station Components" www.sturatenergy.com/products/dp_stationcomponents.asp Jan. 11, 2002.

\* cited by examiner

SYSTEM AND METHOD FOR REFUELING A HYDROGEN VESSEL

CROSS REFERENCE TO RELATED APPLICATIONS

This application claims priority to U.S. Provisional Patent Application No. 60/319,087 filed Jan. 22, 2002, which is incorporated herein by reference in its entirety.

BACKGROUND

This disclosure relates to refueling, and, more particularly, to refueling a hydrogen vessel.

Electrochemical cells are energy conversion devices, usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the prior art is shown generally at 10 and is hereinafter referred to as "cell 10." Reactant water 12 is fed into cell 10 at an oxygen electrode (anode) 14 to form oxygen gas 16, electrons, and hydrogen ions (protons) 15. The chemical reaction is facilitated by the positive terminal of a power source 18 connected to anode 14 and the negative terminal of power source 18 connected to a hydrogen electrode (cathode) 20. Oxygen gas 16 and a first portion 22 of water are discharged from cell 10, while the protons 15 and second portion 24 of the water migrate across a proton exchange membrane 26 to cathode 20. At cathode 20, hydrogen gas 28 is formed and removed, generally through a gas delivery line. Second portion 24 of water, which is entrained with hydrogen gas, is also removed from cathode 20.

An electrolysis cell system may include a number of individual cells arranged in a stack with reactant water being directed through the cells via input and output conduits formed within the stack structure. The cells within the stack are sequentially arranged, and each one includes a membrane electrode assembly defined by a proton exchange membrane disposed between a cathode and an anode. The cathode, anode, or both may be gas diffusion electrodes that facilitate gas diffusion to proton exchange membrane. Each membrane electrode assembly is in fluid communication with a flow field positioned adjacent to the membrane electrode assembly. The flow fields are defined by structures configured to facilitate fluid movement and membrane hydration within each individual cell.

The second portion of water, which is entrained with hydrogen gas, is discharged from the cathode side of the cell and is fed to a phase separation unit to separate the hydrogen gas from the water, thereby increasing the hydrogen gas yield and the overall efficiency of the cell in general. The removed hydrogen gas may be fed directly to a unit for use as a fuel, or it may be fed to a storage facility, e.g., a cylinder or a similar type of containment vessel. A fuel cell system that uses containment vessels for hydrogen fuel storage needs a system and method for quickly and safely refueling those vessels when depleted of hydrogen fuel. Quick refueling operations are prone to significant heating, which can create difficulties in the refueling process.

SUMMARY

Disclosed herein are electrochemical systems and methods for using those systems. In one embodiment, a method for filling a hydrogen gas vessel, comprises: passing hydrogen from a hydrogen gas source to the hydrogen gas vessel, and maintaining the hydrogen gas at a temperature sufficient to enable the filling of a hydrogen gas vessel at a rate that would fill a 5 kg vessel with the hydrogen gas in a period of time of less than or equal to about 10 minutes.

In another embodiment, a method for operating an electrochemical system, comprises forming hydrogen gas in an electrolysis cell, cooling the hydrogen gas to a non-cryogenic temperature, and introducing the cooled hydrogen gas to a vessel.

One embodiment of the electrochemical cell system comprises: an electrolysis cell, a heat exchanger disposed upstream of the hydrogen gas vessel and downstream of the electrolysis cell, and a sensor. The sensor is configured to be disposed in communication with at least one of a hydrogen gas vessel to be filled and a point both upstream of the hydrogen gas vessel and downstream of the heat exchanger, wherein the sensor is disposed in operable communication with the heat exchanger.

Also disclosed is a storage medium encoded with a machine readable computer program code, the code including instructions for causing a computer to implement a method for operating an electrochemical system. In one embodiment, the method comprises: passing hydrogen gas from a hydrogen gas source to a hydrogen gas vessel, and maintaining the hydrogen gas at a temperature sufficient to enable the filling of the hydrogen gas vessel at a rate that would fill a 5 kg vessel with the hydrogen gas in a period of time of less than or equal to about 10 minutes.

Further disclosed herein is a computer data signal comprising instructions for causing a computer to implement a method for operating an electrochemical system. In one embodiment, the method comprises passing hydrogen gas from a hydrogen gas source to the hydrogen gas vessel; and maintaining the hydrogen gas at a temperature sufficient to enable the filling of the hydrogen gas vessel at a rate that would fill a 5 kg vessel with the hydrogen gas in a period of time of less than or equal to about 10 minutes.

The above described and other features are exemplified by the detailed description and accompanying drawings.

BRIEF DESCRIPTION OF THE DRAWINGS

Referring now to the Figures, which are exemplary embodiments, and wherein the like elements are numbered alike.

DETAILED DESCRIPTION

Regardless of whether the hydrogen gas is fed directly to a unit for use as a fuel or fed to a storage facility, the hydrogen gas (as with all compressible fluids) experiences changes in volume. Such changes in volume are governed by standard thermodynamic principles of flow processes. Knowledge of state properties and defining characteristics of an arbitrary volume of hydrogen gas defined by a bounded surface (also known as a "control volume") allows for the application of Newton's laws of thermodynamics. The application of Newton's laws subsequently allows for the calculation of the magnitude of energy exchange between the hydrogen gas and the adjacent environment.

In a flow process in which the hydrogen gas is directed to a control volume that comprises a tank or similar containment structure, movement of the individual gas molecules causes both the specific volume and the linear velocity of the gas to increase. The flow of the gas is due to its adiabatic expansion, and excessive amounts of heat are generated as a result of work done by the engagement of the gas molecules in the control volume and by the gas molecules entering the control volume. Because the gas entering the fixed volume of the tank is elevated in temperature, excess gas needs to be deposited into the tank such that upon cooling (which results in a simultaneous decrease in pressure) to industry standardized temperatures and pressures, the proper amount of hydrogen remains in the tank.

The flows of various gases generate different amounts of heat depending upon their respective molecular structures. In particular, the nature of natural gas is such that the flow thereof into a tank generates little heat compared to the flow of hydrogen gas into a similar tank. During operations in which tanks are filled with natural gas, the slight to moderate amount of heat generated by the flow of the gas enables the material of construction of the tank to withstand the generated heat. In the case of filling of tanks with the compressed hydrogen gas, however, the amount of heat generated may exceed the temperature rating of the material of construction of the tank. In order to avoid exceeding the temperature rating, the gas may need to be cooled during the process of filling the tank.

Figure 2:
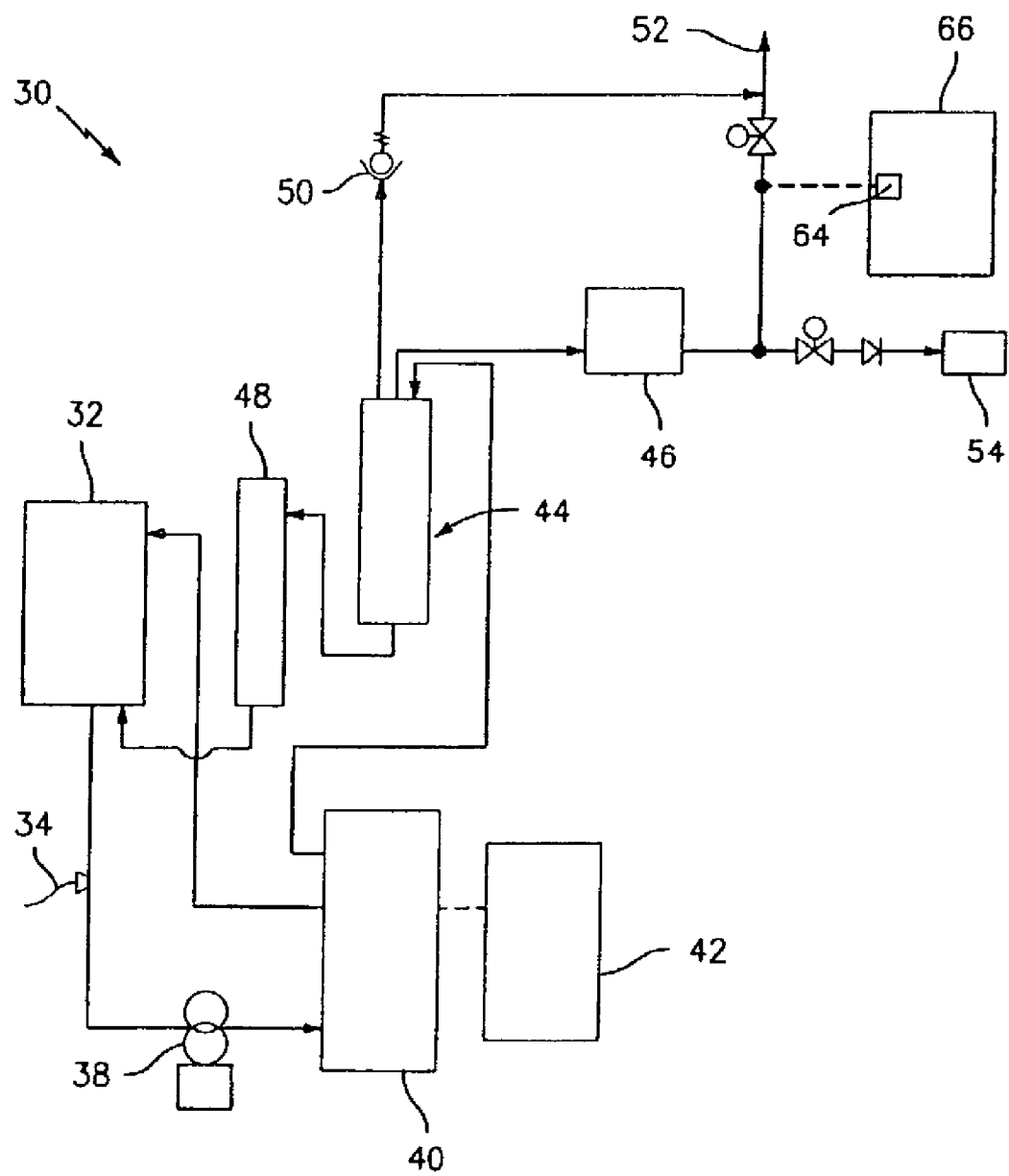
FIG. 2 is a schematic representation of a gas generating apparatus into which an electrolysis cell system may be incorporated.

Referring to FIG. 2, an exemplary embodiment of an electrolysis cell system is shown generally at 30 and is hereinafter referred to as "system 30." System 30 may be generally suitable for generating hydrogen for use as a fuel or for various other applications. While the inventive improvements described below are described in relation to an electrolysis cell, the improvements are applicable to both electrolysis and fuel cells, particularly regenerative fuel cells. Furthermore, although the description and figures are directed to the production of hydrogen and oxygen gas by the electrolysis of water, the apparatus is applicable to the generation of other gases from other reactant materials.

System 30 includes a water-fed electrolysis cell capable of generating hydrogen gas from reactant water. The reactant water utilized by system 30 is stored in water source 32 and is fed by gravity or pumped through a pump 38 into an electrolysis cell stack 40. The supply line, which is preferably clear plasticizer-free tubing, can includes an electrical conductivity sensor 34 disposed therewithin to monitor the electrical potential of the water, thereby determining its purity and ensuring its adequacy for use in system 30.

Figure 1:
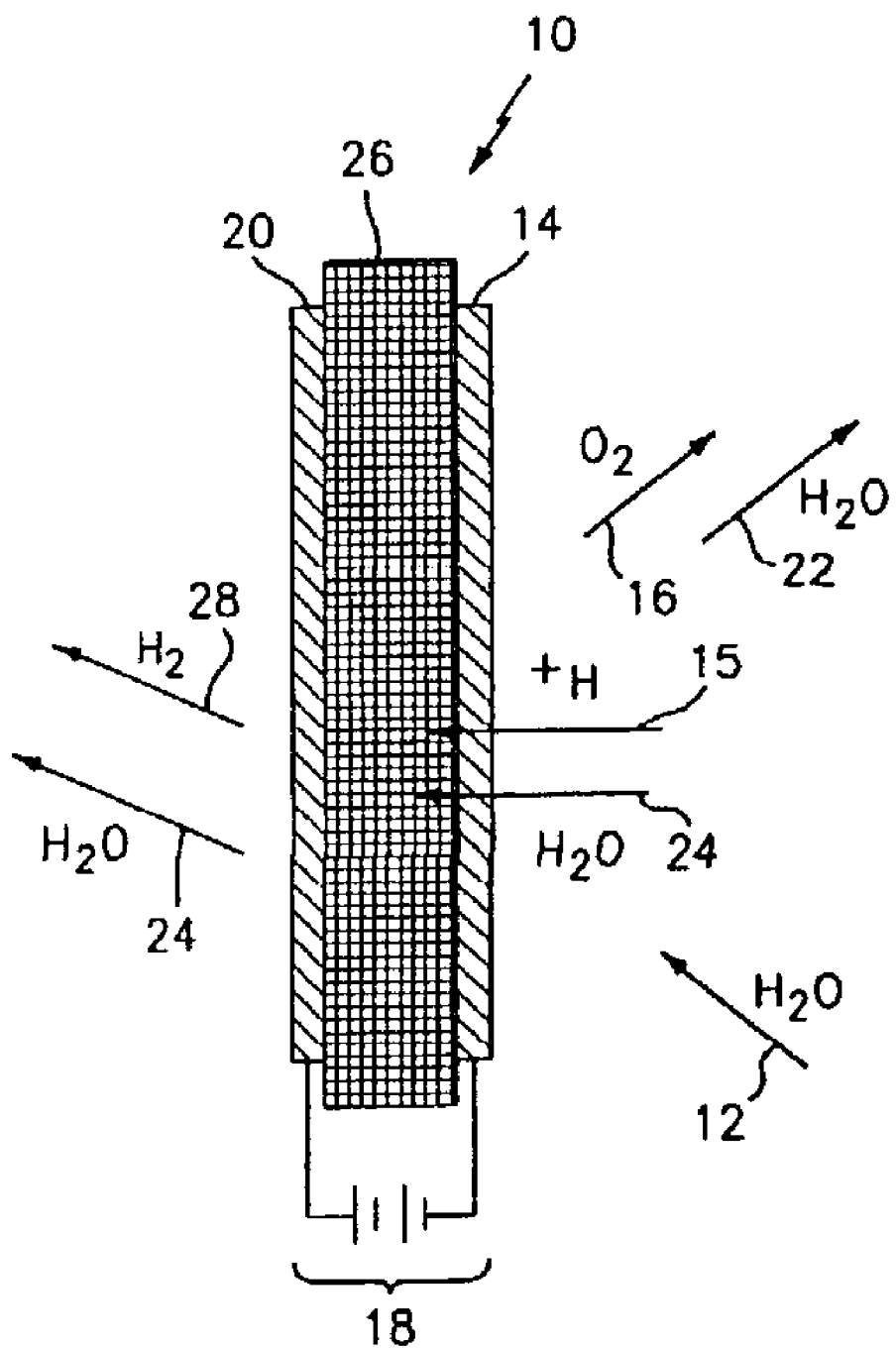
FIG. 1 is a schematic representation of an anode feed electrolysis cell of the prior art.

Cell stack 40 comprises a plurality of cells similar to cell 10 described above with reference to FIG. 1 encapsulated within sealed structures (not shown). The reactant water is received by manifolds or other types of conduits (not shown) that are in fluid communication with the cell components. An electrical source 42 is disposed in electrical communication with each cell to provide a driving force for the dissociation of the water. Electrical source 42 is operatively communicable with a cell control system (not shown) that controls the operation of system 30.

Oxygen and water exit cell stack 40 via a common stream that recycles the oxygen and water to water source 32 where the oxygen is vented to the atmosphere. The hydrogen stream, which is entrained with water, exits cell stack 40 and is fed to a gas/liquid separator or phase separation tank, which is a hydrogen/water separation apparatus 44, hereinafter referred to as "separator 44," where the gas and liquid phases are separated. The exiting hydrogen gas (having a lower water content than the hydrogen stream to separator 44) can be further dried at a drying unit 46, which may be, for example, a diffuser, a pressure swing absorber, desiccant, or the like. This wet hydrogen stream can have a pressure of about 1 pounds per square inch (psi) up to and exceeding about 20,000 psi. Preferably the hydrogen stream pressure is about 1 psi to about 10,000 psi with a pressure of about 100 psi to about 6,000 preferred, a pressure of about 1,500 psi to about 2,500 psi more preferred for some applications, and a pressure of about 100 psi to about 275 psi preferred for other applications.

Water with trace amounts of entrained hydrogen can be returned to water source 32 from separator 44 through a low-pressure hydrogen separator 48. Low pressure hydrogen separator 48 allows hydrogen to escape from the water stream due to the reduced pressure, and also recycles water to water source 32 at a lower pressure than the water exiting separator 44. Separator 44 preferably also includes a release 50, which may be a relief valve, to rapidly purge hydrogen to a hydrogen vent 52 when the pressure or pressure differential exceeds a pre-selected limit. Hydrogen from drying unit 46 is fed to a hydrogen gas storage system 54.

A hydrogen output sensor 64 can be incorporated into system 30 to monitor the hydrogen pressure. Hydrogen output sensor 64 can be any suitable output sensor including, but not limited to, a flow rate sensor, a mass flow sensor, or any other quantitative sensing device such as a pressure transducer that converts the gas pressure within the hydrogen line to a voltage or current value for measurement. Hydrogen output sensor 64 is interfaced with a transmitter 66, which is capable of converting the voltage or current value into a pressure reading. A display (not shown) may be disposed in operable communication with transmitter 66 to provide a reading of the pressure, for example, at the location of hydrogen output sensor 64 on the hydrogen line. Transmitter 66 is any suitable converting device, such as an analog circuit, a digital microprocessor, or the like, capable of converting a sensor signal into a displayable value.

Figure 3:
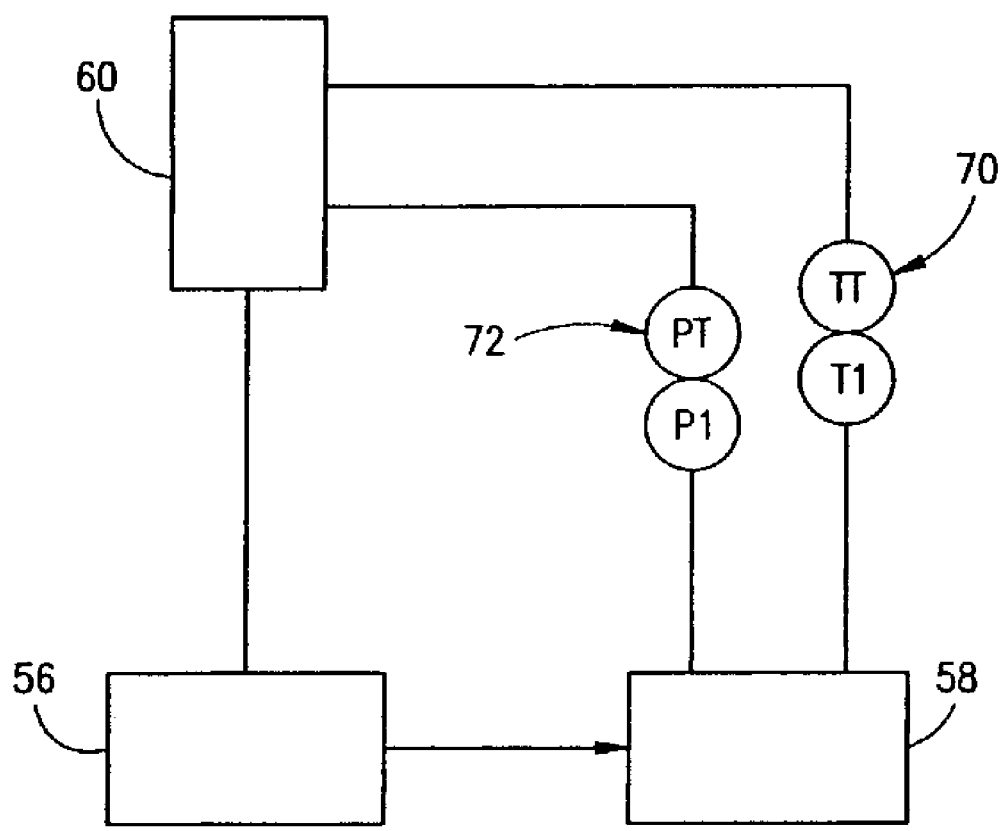
FIG. 3 is a schematic representation of a hydrogen gas storage system disposable in fluid communication with the electrolysis cell system of FIG. 2.

Hydrogen gas storage system 54, shown with reference to FIG. 3, comprises a cooling facility 56 and a storage vessel 58. Cooling facility 56 is generally a heat exchanging apparatus (such as a tube-in-tube, a shell-in-tube heat exchanger, or the like) that utilizes a fluidized cooling stream to remove the sensible heat generated by the flow of the hydrogen gas from cell stack 40 to vessel 58. Cooling facility 56 comprises a cooling stream such that the chilled hydrogen gas exiting therefrom is at a pressure that is higher than the pressure in the vessel being filled and preferably at a temperature of about −10° F. to about 40° F. when ambient temperatures are above about 40° F. Cooling streams that may be utilized with the heat exchanger may comprise water, brines, alcohols, refrigerants, and the like. Alternately, the hydrogen gas may be cooled by being passed through channels formed in a heat sink fabricated from a solid material.

Cooling facility 56 is maintained in informational control with vessel 58 via a control unit 60. Control unit 60 is configured to receive input signals from vessel 58 and to provide feedback control to cooling facility 56. In one exemplary embodiment of hydrogen gas storage system 54, temperature communication is maintained between vessel 58 and control unit 60 via a temperature sensor/transmitter assembly 70. Further, pressure communication is maintained between vessel 58 and control unit 60 via a pressure sensor/transmitter assembly 72.

During operation of the electrolysis cell system 30, hydrogen gas is generated by the electrolysis of water. The hydrogen gas is cooled by cooling facility 56 and delivered to vessel 58 for storage. By cooling the hydrogen gas stream exiting the cooling system to a temperature of about −10° F. to about 40° F., the hydrogen gas storage vessel can be overfilled such that upon equilibration of the temperature of the vessel with ambient temperatures, the vessel contains the proper amount of hydrogen gas. The hydrogen gas can be dispensed from vessel 58 for use in various applications.

The present system obviates the need for cooling the hydrogen gas to cryogenic temperatures. By not cooling the gas to cryogenic temperatures, system resources can be more efficiently operated. In particular, by cooling the hydrogen gas stream to a temperature that approximately corresponds with the freezing point of water, for example, energy consumption of the system can be limited. Because the energy required to cool to cryogenic temperatures is substantial, a significant cost savings can be realized by cooling the hydrogen gas to a temperature sufficient to provide stored hydrogen gas at the desired pressure without exceeding the temperature rating of the vessel. Since hydrogen has a very high specific heat (e.g., 3.41 cal/g/K at 25° C.), there is a relatively large efficiency penalty for cooling hydrogen too far below that required for fast fills. Therefore, this application specifies a modest amount of cooling that is achievable with relatively inexpensive heat exchangers, as opposed to cryogenic cooling and expensive heat exchangers.

The system for fueling a hydrogen vessel can comprise a hydrogen source such as an electrochemical cell (e.g., comprising an electrolyte with a first electrode disposed on one side of the electrochemical cell, and a second electrode disposed on an opposite side of the electrolyte; e.g., a proton exchange membrane cell stack, a potassium hydroxide cell stack, and the like), cylinders, tank truck, reformation (e.g., stern/methane reformation, hydrocarbon reformation, and the like), and the like. A hydrogen storage system is disposed in fluid communication with the hydrogen source. The hydrogen storage system can comprise a cooling facility fluidly disposed between the hydrogen source and a hydrogen vessel. The coaling facility (e.g., a. heat exchanger) is configured to receive a hydrogen from the hydrogen source and to cool the stream to (or to maintain the stream at) a temperature sufficient to enable the storage vessel to be filled to a selected amount (e.g., the fill rating for the vessel), without exceeding a predetermined temperature), e.g., to a temperature of about −10° F. to about 40° F. Although the hydrogen can be cooled to lower temperatures, that is considered an unnecessary expenditure of energy.

For example, a hydrogen gas filling system can comprise an electrolysis cell or other hydrogen gas source, a heat exchanger disposed upstream of the hydrogen gas vessel and downstream of the electrolysis cell, and a sensor. The sensor can be configured to be disposed in thermal or pressure communication with a hydrogen gas vessel to be filled or a point both upstream of the hydrogen gas vessel and downstream of the heat exchanger, and in operable communication with the heat exchanger. In this fashion, the sensor reading (temperature and/or pressure reading) can be employed to control the heat exchanger such that hydrogen gas generated and introduced to the hydrogen gas vessel is maintained at a temperature that enables a rapid fill.

Optionally, the nozzle and/or the hydrogen storage vessel/tank can comprise a temperature sensor (e.g., a feed through and a sensor such that the temperature within the storage vessel can be monitored by the dispensing unit). In this embodiment, the temperature of the hydrogen can be adjusted based upon the temperature within the storage vessel to maintain a temperature that is within the rated limits of the storage vessel, while filling to its rated capacity. Alternatively, the temperature can be monitored to control the temperature such that the storage tank can be filled to its rated capacity rapidly, that is, can be filled in a time period that is less than about half of the thermal time constant. The thermal time constant is the amount of time it would take for a tank that is significantly heated by fast filling (as noted by a temperature rise above ambient of greater than 10° F.) to return to a temperature that has less than approximately 1/e (~37%) of the aforementioned temperature rise. For example, where the thermal time constant for a hydrogen storage tank on a motor vehicle may be 1 or more hours, the use of the cooling can be employed to fill the tank in less than or equal to about 30 minutes, with less than or equal to about 5 minutes preferred.

It is additionally contemplated that the storage tank, itself, could be cooled during dispensing into the tank. Possible cooling techniques include blowing a coolant fluid over the surface of the tank, disposing a coolant passage around the outer surface of the tank, wherein the coolant passage can be connected to a coolant source via a connection located in the hydrogen dispensing nozzle. Similarly, the hydrogen can be cooled as it is dispensed from the storage vessel to ensure a selected temperature range is maintained during the filling of the vessel and/or during the dispensing from the vessel.

Employing cooling of the hydrogen gas prior to introducing it to a storage vessel, e.g., a gas tank on a vehicle, enables rapid filling (e.g., filling of the tank in less than or equal to about 10 minutes). In order for hydrogen fueled vehicles to be practical and to accepted by the general public, fueling of the vehicle will need to be simple and the time for fueling will need to be commensurate with the time it takes to fuel a current vehicles with gasoline. Rapid filling of a tank with hydrogen can result in temperature spikes. Avoidance of the temperature spikes while rapidly filling a tank with hydrogen gas is accomplished by maintaining the temperature of the hydrogen entering and/or in the tank at about −10° F. to about 40° F. during the filling process. This enables the tank to be filled (i.e., in accordance with the tank specifications) at a rate that would fill a 5 kilograms (kg) vessel in less than or equal to about 10 minutes, with less than or equal to about 5 minutes preferred.

It is noted that the disclosed methods can be embodied in the form of computer or controller implemented processes and apparatuses for practicing those processes. It can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the method. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

Previously when hydrogen vessels were filled with hydrogen gas at elevated temperatures, the specification pressure of the vessel (i.e., the maximum standard operating pressure of the vessel, e.g., 5,000 psi) were regularly exceeded up to the maximum rated pressure (i.e., the maximum pressure the vessel can withstand, e.g., about 6,000 psi for a vessel rated at 5,000 psi specification pressure). The disclosed process, however, enables filling of the vessel while not exceeding the specification pressure, even rapidly filling the vessel. For example, hydrogen gas is passed from a hydrogen gas source to a hydrogen gas vessel and a temperature of the hydrogen gas can be controlled to fill the vessel to its specification pressure and maximum volume capacity while maintaining a vessel pressure at less than or equal to the specification pressure.

While the disclosure has been described with reference to a preferred embodiment, various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for filling a hydrogen gas vessel, comprising:
passing hydrogen gas from a hydrogen gas source to a hydrogen gas vessel; and
maintaining the hydrogen gas at a temperature sufficient to enable the filling of the hydrogen gas vessel with the hydrogen gas at a rate that would fill a vessel having a 5 kg capacity to a maximum volume capacity of the vessel, in a period of time of less than or equal to about 10 minutes.

2. The method of claim 1, wherein the period of time is less than or equal to about 5 minutes.

3. The method of claim 1, wherein the hydrogen gas is maintained at a temperature of about $-10°$ F. to about $40°$ F.

4. The method of claim 1, further comprising monitoring at least one of a temperature and a pressure of the hydrogen gas vessel, and controlling the temperature based upon at least one of the monitored temperature and the monitored pressure.

5. A storage medium encoded with a machine readable computer program code, the code including instructions for causing a computer to implement a method for operating an electrochemical system, the method comprising:
passing hydrogen gas from a hydrogen gas source to a hydrogen gas vessel; and
maintaining the hydrogen gas at a temperature sufficient to enable the filling of the hydrogen gas vessel with the hydrogen gas at a rate that would fill a vessel having a 5 kg capacity to a maximum volume capacity of the vessel, in a period of time of less than or equal to about 10 minutes.

6. A computer data signal, the computer data signal, comprising:
instructions for causing a computer to implement a method for operating an electrochemical system, the method comprising:
passing hydrogen gas from a hydrogen gas source to a hydrogen gas vessel; and
maintaining the hydrogen gas at a temperature sufficient to enable the filling of the hydrogen gas vessel with the hydrogen gas at a rate that would fill a vessel having a 5 kg capacity to a maximum volume capacity of the vessel, in a period of time of less than or equal to about 10 minutes.

7. A method for filling a hydrogen gas vessel, comprising:
passing hydrogen gas from a hydrogen gas source to the hydrogen gas vessel; and
controlling a temperature of the hydrogen gas to fill the vessel to its specification pressure and maximum volume capacity while maintaining a vessel pressure at less than or equal to the specification pressure.

8. The method of claim 7, further comprising filling the vessel in less than or equal to about 10 minutes.

9. The method of claim 8, further comprising filling the vessel in less than or equal to about 5 minutes.

10. The method of claim 7, wherein the temperature is above cryogenic temperatures.

11. The method of claim 7, wherein the hydrogen gas is controlled with a heat exchanger, and wherein the heat exchanger is selected from the group consisting essentially of a tube-in-tube heat exchanger, and a shell-in-tube heat exchanger.

12. The method of claim 1, wherein the temperature is above cryogenic temperatures.

13. The method of claim 1, wherein the hydrogen gas is maintained at the temperature with a heat exchanger, and wherein the heat exchanger is selected from the group consisting essentially of a tube-in-tube heat exchanger, and a shell-in-tube heat exchanger.

14. A method for filling a hydrogen gas vessel, comprising:
passing hydrogen gas from a hydrogen gas source to a hydrogen gas vessel; and
maintaining the hydrogen gas at a temperature of about $-10°$ F. to about $40°$ F.; and
filling the hydrogen gas vessel with the hydrogen gas at a rate that would fill a vessel having a 5 kg capacity, to a maximum volume capacity of the vessel, in a period of time of less than or equal to about 5 minutes.

15. The method of claim 14, wherein the hydrogen gas is maintained at the temperature with a heat exchanger, and wherein the heat exchanger is selected from the group consisting essentially of a tube-in-tube heat exchanger, and a shell-in-tube heat exchanger.

16. The method of claim 1, further comprising cooling the hydrogen gas prior to entering the hydrogen gas vessel.

17. The method of claim 16, wherein the hydrogen gas is maintained at a temperature of about $-10°$ F. to about $40°$ F.

18. The method of claim 7, further comprising cooling the hydrogen gas prior to entering the hydrogen gas vessel.

19. The method of claim 18, wherein the hydrogen gas is maintained at a temperature of about $-10°$ F. to about $40°$ F.

20. The method of claim 11, further comprising passing the hydrogen gas through the heat exchanger prior to the hydrogen gas entering the hydrogen gas vessel.

21. The method of claim 13, further comprising passing the hydrogen gas through the heat exchanger prior to the hydrogen gas entering the hydrogen gas vessel.

22. The method of claim 15, further comprising passing the hydrogen gas through the heat exchanger prior to the hydrogen gas entering the hydrogen gas vessel.

* * * * *